US008737511B2

(12) United States Patent
Eidson et al.

(10) Patent No.: US 8,737,511 B2
(45) Date of Patent: May 27, 2014

(54) DIRECTED MIMO COMMUNICATIONS

(75) Inventors: D. Brian Eidson, San Diego, CA (US); Ronald William Chaffee, San Diego, CA (US)

(73) Assignee: XR Communications, LLC, Solana Beach, CA (US)

(*) Notice: Subject to any disclaimer, the term of this patent is extended or adjusted under 35 U.S.C. 154(b) by 0 days.

(21) Appl. No.: 13/447,139

(22) Filed: Apr. 13, 2012

(65) Prior Publication Data
US 2013/0272437 A1    Oct. 17, 2013

(51) Int. Cl.
*H04B 7/02* (2006.01)
*H04L 1/02* (2006.01)

(52) U.S. Cl.
USPC .......................................................... 375/267

(58) Field of Classification Search
USPC ............... 375/267, 211, 146, 347; 455/277.1, 455/63.4, 63.1
See application file for complete search history.

(56) References Cited

U.S. PATENT DOCUMENTS

| | | | | |
|---|---|---|---|---|
| 2002/0132600 | A1* | 9/2002 | Rudrapatna | 455/277.1 |
| 2005/0156801 | A1* | 7/2005 | Honda | 343/754 |
| 2008/0240208 | A1* | 10/2008 | Lou et al. | 375/211 |
| 2009/0322608 | A1* | 12/2009 | Adams et al. | 342/368 |

OTHER PUBLICATIONS

"Combination of MIMO and Beamforming technology for WIMAX." ZTE. ZTE. Nov. 19, 2011. WayBack Machine. Web. Jan. 6, 2014.

Alamouti, S.M. "A Simple Transmit Diversity Technique for Wireless Communications." *IEEE J. Sel. Areas Commun.* 16 (8). Oct. 1998: pp. 1451-1458.
Foschini, G. J. "Layered Space-Time Architecture for Wireless Communication in a Fading Environment When Using Multi-Element Antennas." *Bell Labs Syst. Tech. J.* vol. 1., Autumn 1996: pp. 41-59.
Tarokh, V., et al. "Space-Time Codes for High Data Rate Wireless Communication: Performance Criterion and Code Construction." *IEEE Trans. Inf. Theory.* 44 (2). Mar. 1998: pp. 744-765.
Weerackody, V. "Diversity for the Direct-Sequence Spread Spectrum System Using Multiple Transmit Antennas." *Proc. IEEE Int. Communications Conf 3.* Geneva. May 23-26, 1993: pp. 1775-1779.
Wittneben, A. "Basestation Modulation Diversity for Digital SIMULCAST." *Proc. IEEE Vehicular Technology Conf.* St. Louis, Mo., May 19-22, 1991: pp. 848-853.

* cited by examiner

*Primary Examiner* — Chieh M Fan
*Assistant Examiner* — Wednel Cadeau
(74) *Attorney, Agent, or Firm* — Mintz Levin Cohn Ferris Glovsky and Popeo, P.C.

(57) ABSTRACT

A system is disclosed that includes a plurality of m antenna arrays configured to receive a propagating radio frequency signal. Each antenna array includes a plurality of antenna elements and a beamformer configured to produce n different bi-directional beams using the plurality of antenna elements. The system includes a plurality of n multiple-input multiple-output transceivers (MIMO). Each MIMO transceiver includes a MIMO receiver configured to accept m received signals, wherein the i-th input signal to the j-th MIMO receiver corresponds to the j-th beam of the i-th antenna array. Each MIMO transceiver also includes a MIMO transmitter configured to provide m transmit signals, wherein the v-th output signal from the z-th MIMO transmitter corresponding to the z-th beam of the v-th antenna array is selected for transmission. m, n, v, and z are integer number values, and $i=1, \ldots, m$, $j=1, \ldots, n$, and $v=1, \ldots m$.

20 Claims, 5 Drawing Sheets

DIRECTED MIMO COMMUNICATIONS

FIELD

The subject matter described herein relates to multiple-input multiple-output (MIMO) wireless communications and beamforming antennas.

BACKGROUND

Multiple-input multiple-output (MIMO) wireless communication systems utilize multiple transmit antennas and multiple receive antennas instead of a single antenna. MIMO systems often have multiple transmitters (e.g., one associated with each transmit antenna) and multiple receivers (e.g., one associated with each receive antenna). A transceiver may modulate transmit signals and demodulate receive signals and may perform further processing of receive signals after demodulation and of transmit signals prior to modulation.

Beamforming utilizes multiple antenna elements and often a beamformer to synthesize one or more beams. Such a beamforming antenna can be called an antenna array. Each antenna element of the antenna array is typically the same type of antenna.

SUMMARY

In one aspect, a system and an apparatus are disclosed that includes a plurality of m antenna arrays configured to receive a propagating radio frequency signal. Each antenna array includes a plurality of antenna elements and a beamformer configured to produce n different bi-directional beams using the plurality of antenna elements. The system includes a plurality of n multiple-input multiple-output transceivers (MIMO). Each MIMO transceiver includes a MIMO receiver configured to accept m received signals, wherein the i-th input signal to the j-th MIMO receiver corresponds to the j-th beam of the i-th antenna array. Each MIMO transceiver also includes a MIMO transmitter configured to provide m transmit signals, wherein the v-th output signal from the z-th MIMO transmitter corresponding to the z-th beam of the v-th antenna array is selected for transmission. m, n, v, and z are integer number values, and i=1, . . . , m, j=1, . . . , n, and v=1, . . . m. The system can have a value of z=[one value between 1 and n], or z=1, . . . n. The system can have m=3 and n=6.

The system can be configured to substantially comply with one or more of Electrical and Electronic Engineers (IEEE) 802.11a/b/g/n/ac (WiFi), IEEE 802.16 (WiMAX), 2nd Generation Partnership Project (3GPP) Long Term Evolution (LTE), 3GPP LTE-Advanced, 3GPP LTE-TDD, 3GPP LTE-FDD, High Speed Packet Access (HSPA), and HSPA+. The system can simultaneously provide MIMO and beamforming The m antenna arrays can be separated by a distance more than one wavelength apart at the carrier frequency. The antenna elements can be less than or equal to one half wavelength apart at the carrier frequency. The beamformer can be an electronic beamformer. The antenna array may include a lens including a Honda or Rotman lens.

In another aspect is an apparatus including a plurality of m antenna arrays configured to receive a propagating radio frequency signal. Each of the antenna arrays include a plurality of antenna elements and a beamformer configured to produce n different bi-directional beams using the plurality of antenna elements. The apparatus also includes a plurality of n multiple-input multiple-output receivers (MIMO), each MIMO receiver configured to accept m received signals, wherein the i-th input signal to the j-th MIMO receiver corresponds to the j-th beam of the i-th antenna array. m and n are integer number values, and i=1, . . . , m, and j=1, . . . , n.

In another aspect is an apparatus including a plurality of m antenna arrays configured to receive a propagating radio frequency signal. Each of the antenna arrays includes a plurality of antenna elements and a beamformer configured to produce n different bi-directional beams using the plurality of antenna elements. The apparatus also includes a plurality of n multiple-input multiple-output transmitters (MIMO), each MIMO transmitter configured to provide m transmit signals, wherein the v-th output signal from the z-th MIMO transmitter corresponding to the z-th beam of the v-th antenna array is selected for transmission. m, n, v, and z are integer number values, and j=1, . . . , n, and v=1, . . . m.

The current subject matter provides many advantages. For example, as described herein, MIMO and beamforming can be combined to provide range extension and throughput enhancement supported at either or both of a base station and mobile terminal. The resulting solution is practical and cost-effective.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

Figure 1:
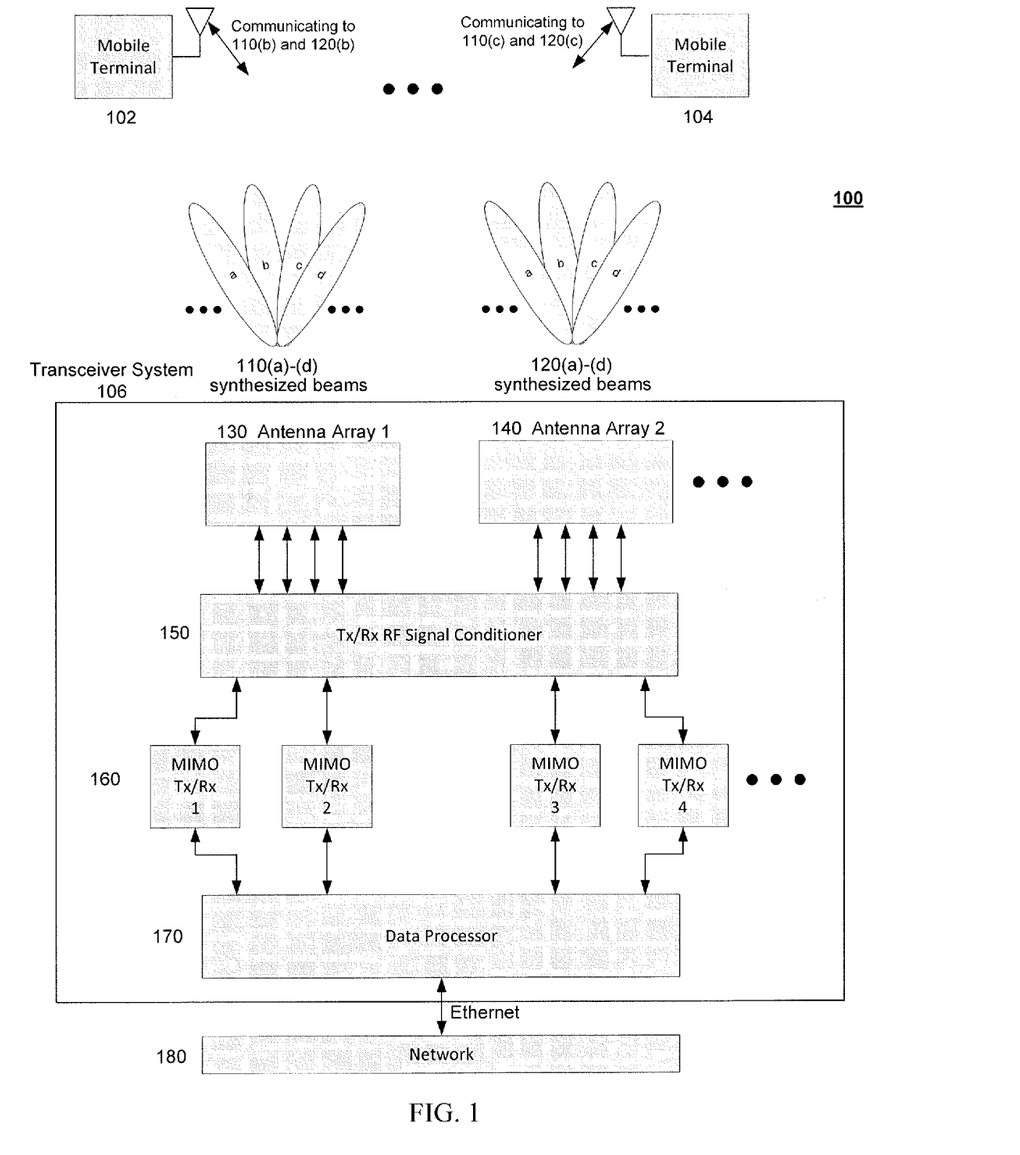
FIG. 1 depicts an example of a block diagram of a transceiver for extended communications range and throughput using MIMO and beamforming.

FIG. 1 depicts an example of a block diagram of a transceiver for extended communications range and throughput using MIMO and beamforming. In this example, mobile terminals 102, 104 are in communications range with transceiver system 106. Two multi-beam antenna arrays 130, 140 each communicate with both mobile terminals 102, 104. Signals received from the mobile terminals and signals to be transmitted to the mobile terminals are processed by transceiver radio frequency signal conditioner (Tx/Rx RF signal conditioner) 150 and passed from/to MIMO transceivers 160 where the received signals are transformed into receive data and transmit data is transformed into transmit signals after signal conditioning by 150. User data to/from the transceivers flows from/to the user data processor 170.

Mobile terminals 102, 104 may be implemented as mobile wireless devices, although at any given time either mobile terminal may be stationary. Each mobile terminal may be referred to as, for example, a device, a user equipment, a mobile station, a mobile unit, a subscriber station, a wireless terminal, a terminal, a tablet, a netbook computer, a laptop computer and/or any other wireless device. Moreover, each mobile terminal 102, 104 may also be implemented as, for example, a wireless handheld device, a wireless plug-in accessory, or the like. For example, the mobile terminal 102, 104 may take the form of a wireless phone, a computer with a wireless connection to a network, or the like. In some instances, the mobile terminal 102, 104 may include one or more of the following: at least one processor, at least one computer-readable storage medium (e.g., memory, storage, and the like), at least one user interface, and at least one radio access mechanism. Although FIG. 1 only shows one antenna for each of mobile terminals 102, 104, each terminal may have more than one antenna.

In some implementations, transceiver system 106 is part of a base station providing wireless access to a wireless local area network and/or a public land mobile network. For example, transceiver system 106 may be implemented as a cellular base station of a public land mobile network and/or as a wireless access device (e.g., a Wi-Fi wireless access point) providing access to a wireless network. Although transceiver system 106 is often located at a fixed location, transceiver system 106 can be mobile, moveable and/or transportable.

Antenna array 130 and/or antenna array 140 may receive a signal transmitted by another device, such as a mobile terminal, user equipment, mobile station, and the like. In some implementations, the received signal is configured in accordance with MIMO, although signals other than MIMO may be used as well. The received signal may also be configured in accordance with one or more wireless standards. For example, the received signal may be configured to substantially comply with a standard system specification, such as, for example, Institute for Electrical and Electronic Engineers (IEEE) 802.11a/b/g/n/ac (WiFi), IEEE 802.16 (WiMAX), 2rd Generation Partnership Project (3GPP) Long Term Evolution (LTE), 3GPP LTE-Advanced, 3GPP LTE-TDD (time division duplexing), 3GPP LTE-FDD (frequency division duplexing), High Speed Packet Access (HSPA), HSPA+, and other commercial wireless standards, and/or proprietary standards. Moreover, the received signal may carry one or more of voice, video, images, data, control information, and any other information.

Antenna arrays 130, 140 each synthesize a plurality of antenna beams where each beam of an antenna array is designed to provide gain in a prescribed solid angle different from the other beams also synthesized by the same array. For example, antenna array 130, antenna array 140 may produce four beams each. In some implementations, transceiver system 106 is configured to allow communication between a mobile terminal and beams of antenna arrays 130, 140 with the same beam index. In the example of FIG. 1, beams 110(*b*) and 120(*b*) are configured to provide acceptable gain in the direction of mobile terminal 102. In this case, the index for the beam of both antenna arrays that is communicating with mobile terminal 102 is "b," as shown in FIG. 1. Similarly, mobile terminal 104 is in communication with beams of index "c" of both antenna arrays 130, 140.

The number of beams produced by antenna arrays 130, 140 is a parameter determined by design of the array. Although FIG. 1 shows four beams per array, a greater or smaller number of beams is also possible. Also, although FIG. 1 shows two antenna arrays, any practical number of arrays can be used limited by cost, available power, co-site interference, beam overlap, and the like.

Antenna arrays 130, 140 can be implemented in many different antenna technologies. For example, the individual elements of an array may each be a dipole antenna, monopole antenna, slot antenna, slotted waveguide antenna, horn antenna, microstrip patch antenna or any other antenna type. The antenna array 130, 140 may be configured with a beamformer that provides fixed beams or steerable beams. Steerable beams may be electromechanically steered or electronically steered. Electronically steered arrays are sometimes referred to as phased arrays. The antenna array may further be coupled to a lens such as a Rotman lens or Honda lens (see, for example, U.S. Pat. No. 6,980,169), and/or a polarizer. Some antenna arrays 130, 140 can incorporate a combination of steering mechanisms such as phased arrays that are electromechanically steered to a quadrant of space and electronically steered within the quadrant. Other combinations of the above elements are possible such as a lens that is electromechanically adjusted.

Tx/Rx RF signal conditioning 150 includes signal processing functions that may include filtering and amplification, and in some implementations may also include frequency upconversion and/or downconversion, and the like. These functions may be performed in the analog domain, may be performed digitally, or may be performed in a combination thereof.

Multiple MIMO transceivers are shown at 160. MIMO transceivers may perform digital signal processing associated with demodulation and decoding as well as modulation and encoding. In some configurations, there are as many MIMO transceivers 160 as beams supported by any one antenna. In this configuration, the number of antenna arrays is equal to the number of receive input and transmit output ports on each MIMO transceiver. Other configurations are also possible. Although Tx/Rx RF signal conditioning 150 and MIMO transceivers 160 are shown separately in FIG. 1, they may be combined into a single component or element.

Data processor 170 manages MIMO transceivers 160 and provides an interface such as an Ethernet interface to a network 180. Data may be sent from the network 180 to MIMO transceivers 160, conditioned by Tx/Rx RF signal conditioner 150 and then transmitted by antenna arrays 130, 140 or both, to one or more mobile terminals such as 102, 104. Similarly, one or more mobile terminals may transmit signals received by one or more of antenna arrays 130, 140, conditioned by 150, received by MIMO transceivers 160 and processed by data processor 170 for distribution to network 180.

Figure 2:
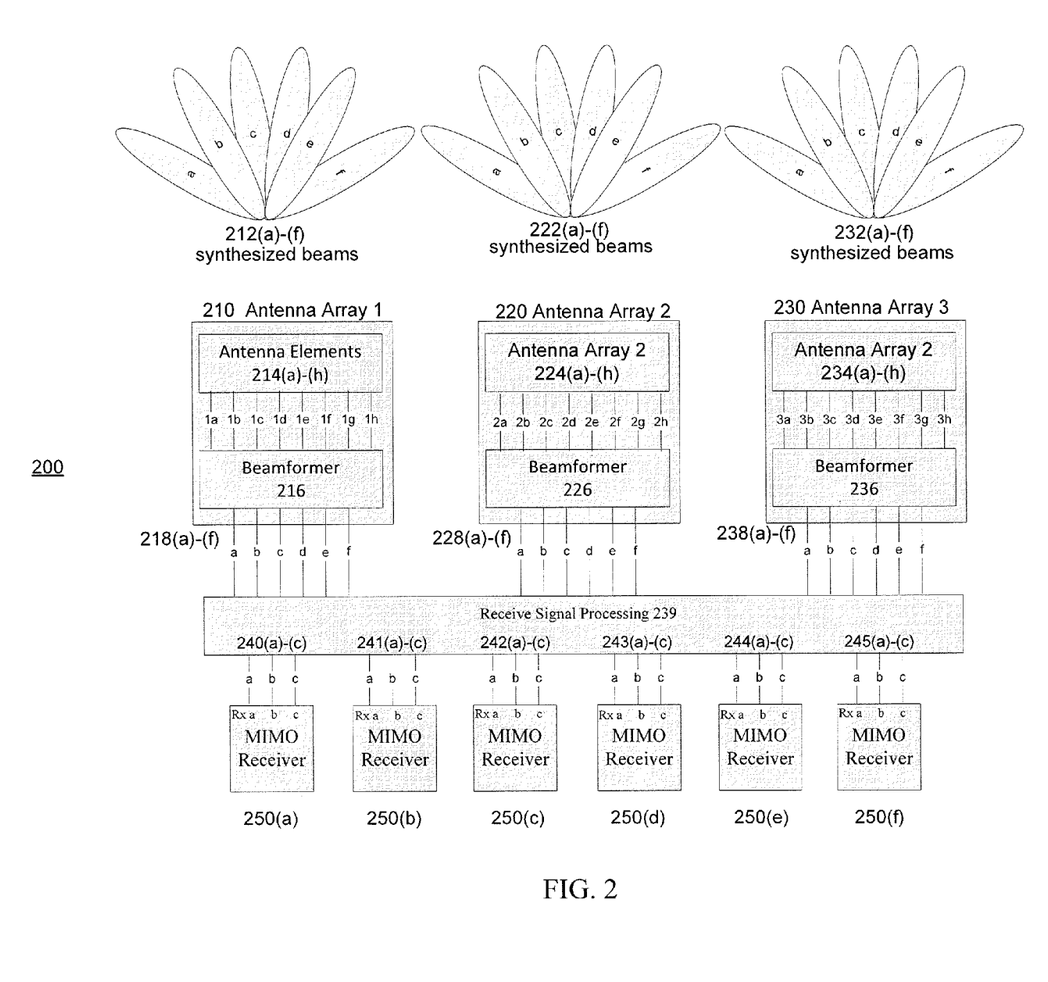
FIG. 2 depicts an example of a block diagram of a receiver for extended communications range and throughput using MIMO and beamforming.

FIG. 2 depicts an example of a block diagram of a receiver 200 for extended communications range and throughput with three antenna arrays 210, 220 and 230 and six MIMO receivers 250(*a*)-(*f*). Only the receive portion of a transceiver is shown in this example to simplify the description. In this example, each antenna array produces six independent beams 212(*a*)-(*f*), 222(*a*)-(*f*), and 232(*a*)-(*f*) although each antenna array 210, 220, 230 could produce a different number of beams. Antenna arrays 210, 220 and 230 may be comprised of antenna elements 214(*a*)-(*h*), 224(*a*)-(*h*), and 234(*a*)-(*h*), respectively, as well as beamformers 216, 226, and 236. Although in this example each antenna array 210, 220, and 230 is comprised of eight antenna elements 214(*a*)-(*h*), 224(*a*)-(*h*), and 234(*a*)-(*h*), different numbers of elements per array could be used. The six beams 212(*a*)-(*f*), 222(*a*)-(*f*), and 232(*a*)-(*f*) of each antenna array are synthesized by antenna elements 214(*a*)-(*h*), 224(*a*)-(*h*), and 234(*a*)-(*h*), and beamformers 216, 226 and 236, respectively.

Each of the six beams of each antenna is associated with a corresponding signal 218(*a*)-(*f*), 228(*a*)-(*f*), and 238(*a*)-(*f*). MIMO receivers 250(*a*), 250(*b*), 250(*c*), 250(*d*), 250(*e*) and 250(*f*) are connected to beamformers 216, 226, and 236 such that beamformer output 218(*a*) corresponding to beam 212(*a*) is connected to MIMO receiver 250(*a*) at 240(*a*). Similarly, beamformer output 228(*a*) corresponding to beam 222(*a*) is connected to receiver 250(*a*) at 240(*b*), and beamformer output 238(*a*) corresponding to beam 232(*a*) is connected to MIMO receiver 250(*a*) at 240(*c*). In the same fashion, beamformer output 218(*b*) corresponding to beam 212(*b*) is connected to MIMO receiver 250(*b*) at 241(*a*), beamformer output 228(*b*) corresponding to beam 222(*b*) is connected to MIMO receiver 250(*b*) at 241(*b*), and beamformer output 238(*b*) corresponding to beam 232(*b*) are connected to MIMO receiver 250(*b*) at 214(*c*). The same connection pattern is used for MIMO receivers 250(*c*), 250(*d*), 250(*e*), and 250(*f*) connected to 242(*a*)-(*c*), 243(*a*)-(*c*), 244(*a*)-(*c*), and 245(*a*)-(*c*) corresponding to beamformer outputs 218(*c*)-(*f*), 228(*c*)-(*f*), and 238(*c*)-(*f*) and beams 212(*c*)-(*f*), 222(*c*)-(*f*), and 232(*c*)-(*f*).

Although the diagram 200 of FIG. 2 depicts three antennas arrays 210, 220, 230 with six beams each connected to six MIMO receivers 250(*a*)-(*f*) that can accept three inputs each, any number of antennas connected to MIMO transceivers that can accommodate the same number of inputs as antennas could be used. There are an equal number of MIMO receivers as beams per antenna array. For example, four antennas with three beams each could be connected to three MIMO receivers each with four inputs. Similarly, two antenna arrays with three beams each could be connected to three MIMO receivers with two inputs each. In some implementations, multiple MIMO receivers are implemented on a single circuit card and/or in a single enclosure. In some implementations, one MIMO receiver may be capable of handling multiple receive channels simultaneously. The implementation of FIG. 2 is scalable to any number of beams provided the availability of MIMO processors that are capable of accommodating the antenna inputs. The number of inputs per MIMO receiver is sometimes referred to as its dimension.

The example system of FIG. 2 allows antenna arrays 210, 220 and 230 to be as far apart as practical, thus providing spatial diversity, while, at the same time, each antenna array 210, 220 and 230 supports beamforming by the design of antenna elements 214(*a*)-(*h*), 224(*a*)-(*h*), 234(*a*)-(*h*) and beamformers 216, 226 and 236. For example, the characteristics of beams 212(*a*)-(*f*) including beamwidth, gain and side lobe features, are determined by the type and design of each antenna element 214(*a*)-(*h*), the spacing between elements, and the beamformer 216. MIMO performance is enhanced by placing antennas 210, 220 and 230, a distance apart that is many times to many thousands of times (or greater) farther apart than the distance between elements of the array.

In some implementations, the antenna elements produce fixed beam directions that cannot be changed once the antenna is mounted and aligned. For example, the antenna arrays can be aligned so that the beams with the same index of antenna arrays 210, 220 and 230 point in the a direction that is parallel to each other. For example, beam 212(*a*) may be parallel to beams 222(*a*) and 232(*a*). Similarly, beams 212(*b*), 222(*b*), and 232(*b*) may point in parallel directions. If the distance to the mobile terminal being communicated with is sufficiently far, the same beam index of all three antenna arrays will provide sufficient gain to support communication. Using the same beam index for each antenna reduces the receiver complexity.

Figure 3:
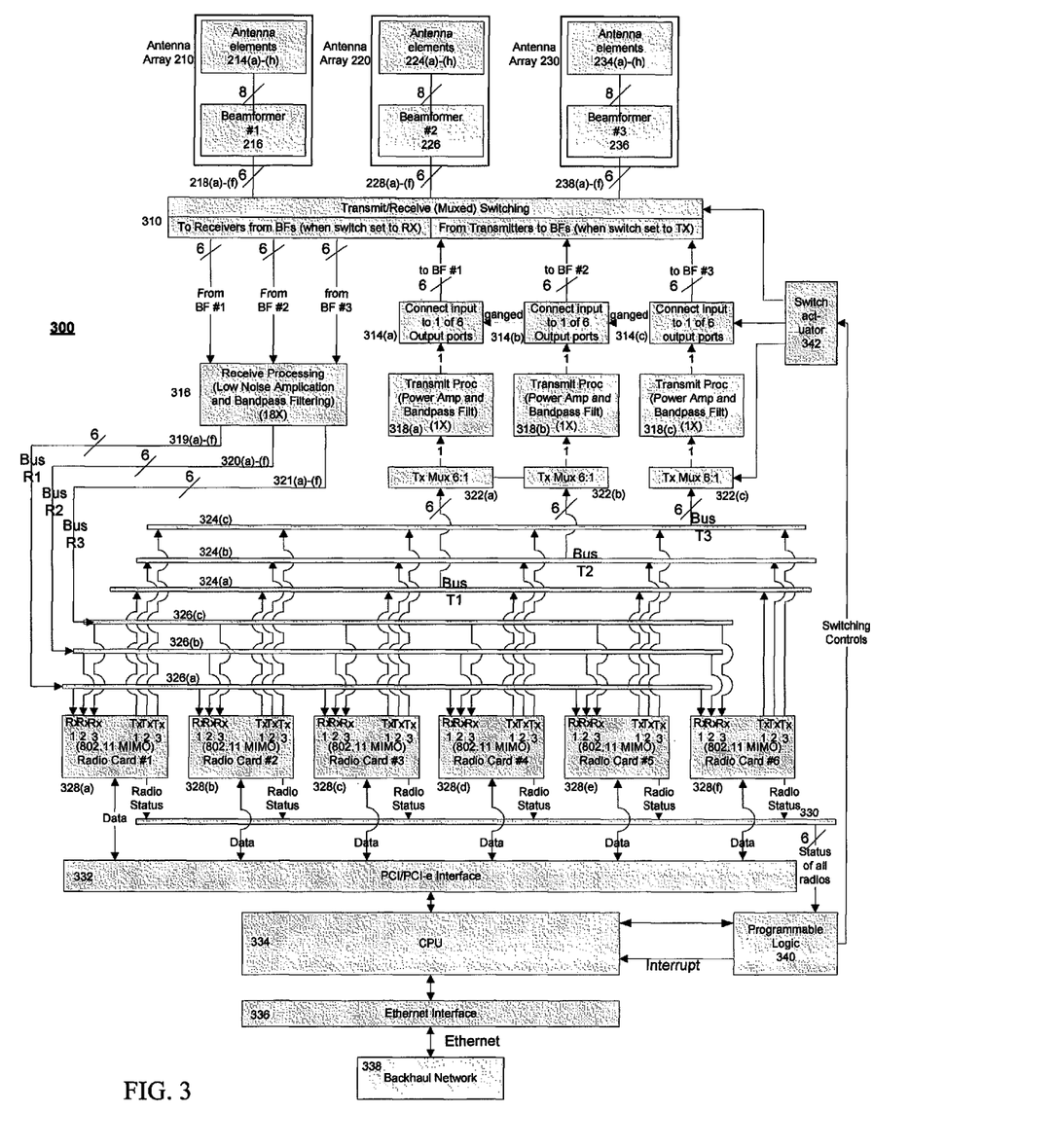
FIG. 3 depicts an example of block diagram of a time-division duplexing transceiver for extended communications range and throughput using MIMO and beamforming.

FIG. 3 depicts an example of a block diagram for a time-division duplexing (TDD) transceiver for extended communications range and throughput using MIMO and beamforming. In this example, the communications range may be increased by enabling one transmit beam at a time per antenna array allowing all of the radio frequency transmit power to be concentrated into one beam rather than spread-out over multiple beams. In operation, this is particularly useful when overall power is constrained by regulation such as in unlicensed bands (e.g. WiFi/802.11). The benefit is further enhanced in certain unlicensed bands for point-to-point transmissions where only one transmit beam is used.

In the example shown in FIG. 3, time-division duplexing (TDD) transceiver 300 extends the communications range and throughput with three antennas arrays 210, 220 and 230 and six MIMO transceivers 250(*a*)-(*f*). In this example, each antenna array produces six independent beams 212(*a*)-(*f*), 222(*a*)-(*f*), and 232(*a*)-(*f*) although each antenna array could produce a different number of beams. Antenna arrays 210, 220 and 230 are comprised of antenna elements 214(*a*)-(*h*), 224(*a*)-(*h*), and 234(*a*)-(*h*), respectively, as well as beamformers 216, 226, and 236. Each antenna array 210, 220, and 230 is comprised of eight antenna elements 214(*a*)-(*h*), 224(*a*)-(*h*), and 234(*a*)-(*h*), although a different number of elements per array could be used. The six beams 212(*a*)-(*f*), 222(*a*)-(*f*), and 232(*a*)-(*f*) of each antenna array are synthesized by antenna elements 214(*a*)-(*h*), 224(*a*)-(*h*), and 234(*a*)-(*h*) and beamformers 216, 226 and 236, respectively. Each of the six beams of each antenna is associated with a corresponding signal 218(*a*)-(*f*), 228(*a*)-(*f*), and 238(*a*)-(*f*).

In this example, the corresponding signals 218(*a*)-(*f*), 228(*a*)-(*f*), and 238(*a*)-(*f*) are connected to transmit-receive (T/R) switches 310. The T/R switches 310 allow at any given time only a transmit signal or a receive signal to pass through the switch per antenna array. For example, the T/R switch corresponding to antenna array 210 may be set to transmit. In this case, a transmit signal is passed from switch 314(*a*) to antenna array 210 but no receive signal is passed through the T/R switch 310 at that same time. Whether the T/R switch corresponding to antenna array 210 is set to transmit or receive is independent of whether the T/R switch corresponding to antenna array 220 is set to transmit or receive, or whether the T/R switch corresponding to antenna array 230 is set to transmit or receive. For example, T/R switches 310 may be set to send a transmit signal to antenna array 210 at the same time T/R switches 310 are set to pass receive signals from antenna arrays 220, 230.

On one side of the T/R switch 310 are the six signals from each antenna array (e.g. 218(*a*)-(*f*)). In some time division duplexing implementations such as FIG. 3, each of the six signals 218(*a*)-(*f*) may be an input to an antenna array, a signal to be transmitted by the array; or an output of the antenna array, a signal received by the antenna array.

On the other side of T/R switches 310 are three groups of six outputs (received signals) leading to receive processing 316. Each group of six corresponds to received signals from one of the three arrays and the six signals in each group correspond to the six signals received from one antenna array, each one of the six corresponding to a signal from one of the six beams of a one antenna array. Each signal in the three groups of six receive signals, eighteen in total, is passed from the T/R switches 310 to a signal conditioning receive processor 316, each signal conditioning receive processor providing at least low noise amplification and signal filtering.

Each output from 316, 319(*a*)-(*f*), 320(*a*)-(*f*), and 321(*a*)-(*f*) corresponds to a different one of beams 212(*a*)-(*f*), 222(*a*)-(*f*), and 232(*a*)-(*f*). For example, signal 319(*a*) originates at beam 214(a) of antenna array 210. Similarly, the signal 320 (d) originates at beam 224(d) and signal 321(a) originates at beam 234(a). Each group of signals connects to a receive bus. For example, signals out of receive processor 316 that correspond to antenna array 210 connect to bus R1 (326(a)). Similarly, signals corresponding to antenna array 220 connect to bus R2 (326(b)) and signals corresponding to antenna array 230 connect to bus R3 ((326(c)). Bus R1 is configured to distribute the signals from the beams of antenna array 210 to one receive input of each MIMO transceiver 328(a)-(f). For example, bus R1 connects signal 319(a) to the receive input of MIMO transceiver 328(a) labeled Rx 1, connects signal 319(b) to the receive input of MIMO transceiver 328(b) labeled Rx 1, connects signal 319(c) to the receive input of MIMO transceiver 328(c) labeled Rx 1, and so on for signals 319(d)-(f) and transceivers 328(d)-(f). Bus R2 connects 320(a)-(f) to transceivers 328(a)-(f) in the same fashion. Bus R2 connects signal 320(a) to the receive input of MIMO transceiver 328(a) labeled Rx 2, connects signal 320(b) to the receive input of MIMO transceiver 328(b) labeled Rx 2, connects signal 320(c) to the receive input of MIMO transceiver 328(c) labeled Rx 2, and so on for signals 320(d)-(f) and transceivers 328(d)-(f). Bus R3 connects signals 321(a)-(f) to transceivers 328(a)-(f) in the same fashion.

Also on the other side of the T/R switch 310 are three groups of six inputs (transmit signals), each group of six connected to a switch 314(a), 314(b) or 314(c), each group corresponding the six beams or one of the antenna arrays 210, 220 or 230. Each one of the six beams of each antenna array corresponds to one possible transmit signal.

Each switch connects one of the six outputs (corresponding to the six beams of each antenna array) to the output of a single power amplifier. The three power amplifiers with filters 318(a), 318(b) and 318(c) provide the transmit RF signal for each of the three antenna arrays. Any combination of the three power amplifiers (including none) can be used and any one time. The input of each power amplifier with filter is connected to another switch, a 6:1 transmit multiplexer (MUX). Transmit multiplexer (Tx MUX) 322(a) selects one of the six signals from transmit bus T1 (324(a)) to connect to power amplifier with filter 318(a). Similarly, Tx MUX 322(b) selects one of six signals from bus T2 (324(b)) to connect to power amplifier 318(b), and Tx MUX 322(c) selects one of six signals from bus T3 (324(c)) to connect to power amplifier 318(c). The combination of transmit multiplexer (e.g. 322(a)), power amplifier with filter (e.g. 318(a)) and switch (e.g. 314(a)), selects one of six inputs from a transmit bus (e.g. T1 324(a)) to connect, amplify, filter, and connect via switch (e.g. 314(a)) through T/R switches 310 to one of the six beams (e.g. 224(a)) of one antenna array (e.g. 220).

Six MIMO transceivers 328(a)-(f) each connect three receive inputs, one to each of receive busses R1 (326(a)), R2 (326(b)), and R3 (326(c)) and each connect three transmit outputs, one to each of transmit busses T1 (324(a)), T2 (324(b)), and T3 (326(c)). By doing this, one beam of each antenna array (210, 220 and 230) can be connected through T/R switch 310, receive processor 316, to the receive section of one MIMO transceiver (e.g. 250(a)). Similarly, the three transmit outputs of a single MIMO transceiver can be connected through Tx MUXs 322(a)-(c), power amplifiers and filters 318(a)-(c), switches 314(a)-(c) and T/R switch 310 to one beam of each antenna array 210, 220 and 230. The three transmit signals from 314(a), 314(b), and 314(c) may be connected to any three of the 18 transmit signals from MIMO transceivers 328(a)-(f). In this implementation, only one of the six signals on T1 only one of the six Tx 1 outputs of transceivers 250(a)-(f) is amplified, filtered and provided to one of the six beams of antenna array 210. In addition, one of the six signals of T2 and one of the signals of T3 is also provided to antenna arrays 220 and 230, respectively.

Each MIMO transceiver interfaces to a central processing unit (CPU) 334 via PCI/PCI-e interface 332. Data received by each MIMO transceiver and data to be sent by each MIMO transceiver is passed over the PCI/PCI-e interface 332. PCI/PCI-e is an example interface and other interfaces (or bridges to other interfaces) could be used such as Ethernet, ATM, USB and any other wired or wireless interface. CPU 334 connects to a backhaul network 338 via an Ethernet 336 or other interface.

Each MIMO transceiver may perform built-in test functions periodically or as commanded by the CPU to assess if each transceiver is performing properly. CPU 334 may also pass commands to each transceiver. The commands may be passed over the radio status interface, PCI/PCI-e interface or other interface. The radio status interface for each radio is managed by programmable logic 340 and CPU 334. Programmable logic 340 controls switch actuator 342 to select TX MUXs 322(a)-(c), switches 314(a)-(c) and TR Switch 310 position (Tx or Rx). Programmable logic 340 may also use radio card status information to determine the actual positions of TX MUXs 322(a)-(c), switches 314(a)-(c) and TR Switch 310. This provides closed loop feedback that switching commands have been properly executed. It also is used to prevent a Radio Card from attempting a transmission when another is transmitting, or a Radio Card from attempting a transmission when the T/R switch is set to receive For example, programmable logic 340 and/or CPU 334 may determine that a radio card(s) different from the current radio, card(s) should be enabled for transmission. Programmable logic 340 and/or CPU 334 may determine which radio card(s) should be used and which should be idled and may also coordinate the delivery of idle signals. Managing multiple radio cards is disclosed in U.S. patent application Ser. No. 10/700,342 "Signal Communication Coordination" and is herein incorporated by reference in its entirety.

Some operations required for determining which radio card(s) should be enabled and which should be idled may be performed in programmable logic 340 and some operations may be performed in CPU 334. Operations that require low latency or rapid processing are generally performed in programmable logic 340 while less time-critical operations may be performed in CPU 334. In some instances, to take advantage of regulatory constraints, a single transmitter may be desirable. In other instances, more than one transmitter may be used at a time.

Figure 4:
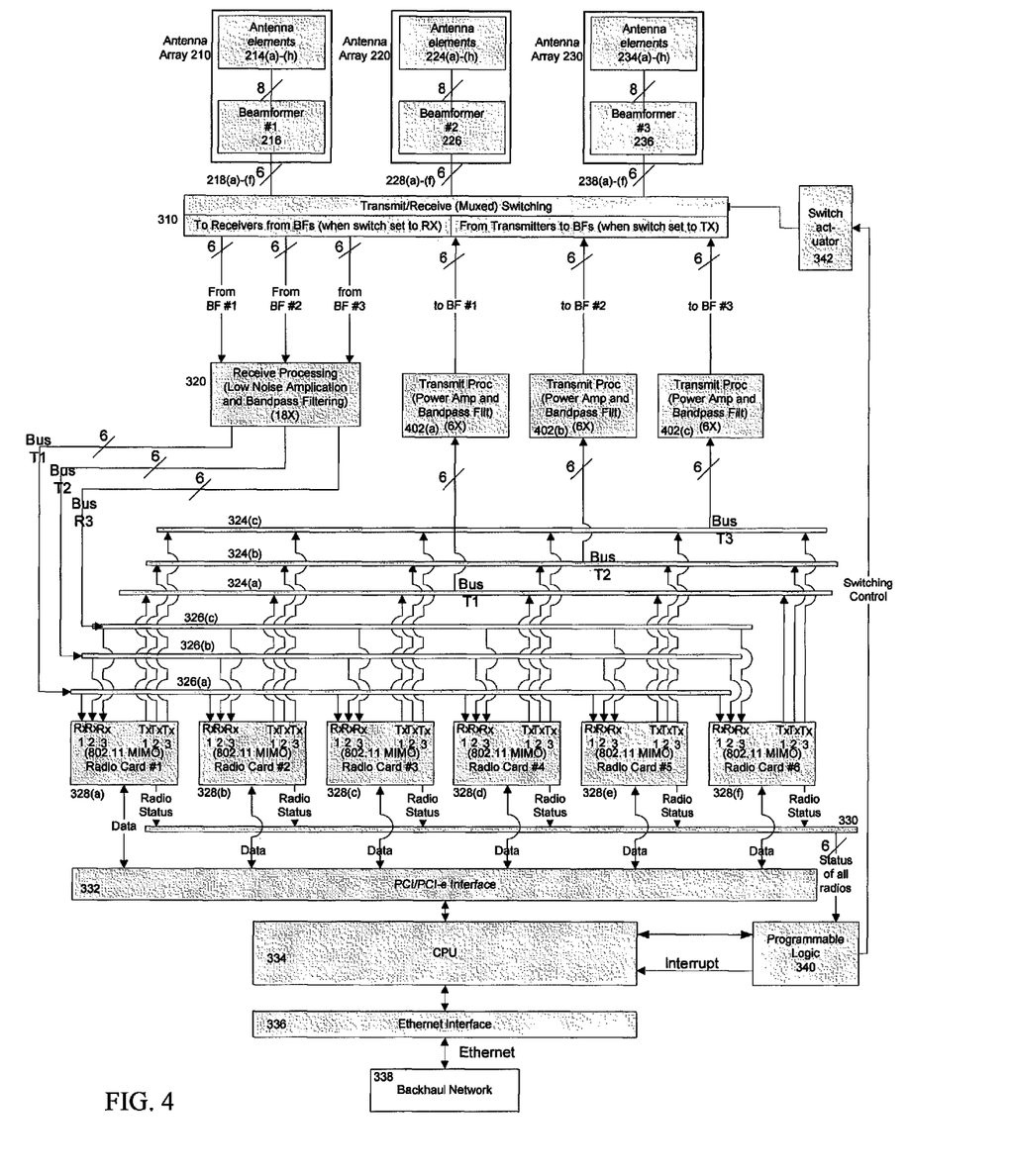
FIG. 4 depicts another example of a block diagram for a time-division duplexing transceiver for extended communications range and throughput using MIMO and beamforming.

FIG. 4 depicts another example of a block diagram for a time-division duplexing transceiver for extended communications range and throughput using MIMO and beamforming. The transceiver 400 has many of the same features as the transceiver 300. Transceiver 400 adds the capability to transmit on all six beams of each of the three antenna arrays 210, 220 and 230, for a total of 18 simultaneous transmit beams instead of the three beams of transceiver 300. If transceiver 300 and transceiver 400 are the same except transceiver 400 supports 18 simultaneous transmit beams and transceiver 300 supports 3 simultaneous transmit beams with the total transmit power of 300 equal to the total transmit power of 400, transceiver 400 has a higher throughput than transceiver 300 although at a maximum range that is less than 300. Transceiver 400 may be attractive for operation within licensed spectrum, such as the spectrum of the 3GPP LTE-TDD standard.

Transceiver 400 supports three sets of six transmit processing paths 402(a)-(c) for a total of 18 simultaneous transmit processing paths. Each group of six processing paths 402(*a*)-(*c*) corresponds to signals destined for one of the antenna arrays 210, 220 and 230. Each of the 18 processing paths includes at least a power amplifier and a filter. In some implementations of the antenna array, an operator may choose to not simultaneously transmit two different signals on adjacent beams of an antenna array due to spatial overlap of the beams. Spatial overlap results in signal cross-talk or interference between the two beams which degrades performance of one or both beams.

Figure 5:
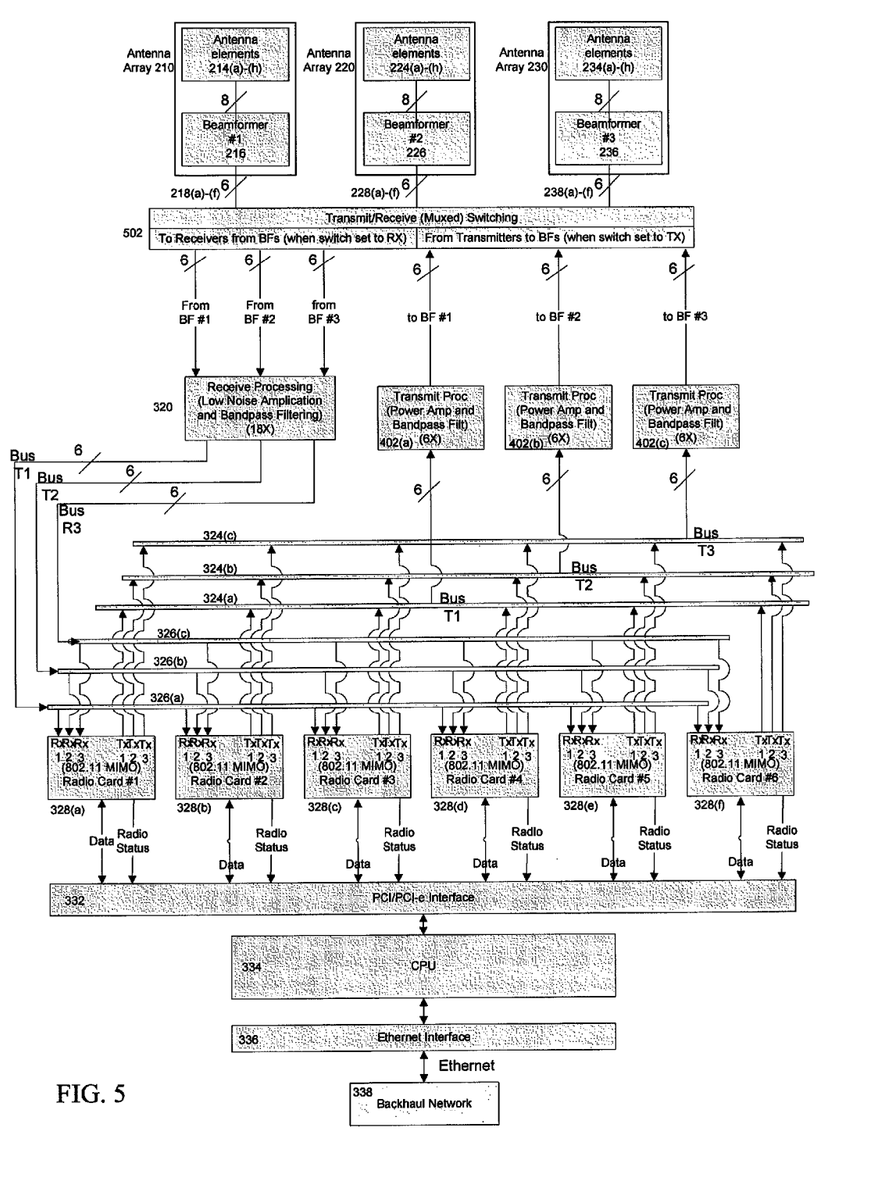
FIG. 5 depicts an example of a block diagram for a frequency-division duplexing transceiver for extended communications range and throughput using MIMO and beamforming.

FIG. 5 depicts an example of a block diagram for a frequency-division duplexing transceiver for extended communications range and throughput using MIMO and beamforming. The transceiver 500 has many of the same features as the transceiver 400 and transceiver 300. Instead of supporting time division duplexing as do transceivers 300 and 400, transceiver 500 supports frequency-division duplexing. Transceiver 500 also supports the capability to transmit on all six beams of each of the three antenna arrays 210, 220 and 230, for a total of 18 simultaneous transmit beams as does transceiver 400. Transceiver 500 may be attractive for use in implementing the 3GPP LTE-FDD standard.

Transceiver 500 shows a system that uses frequency division duplexing (FDD). In a FDD system, transmit signals and receive signals occupy different frequencies. To separate transmit signals from receive signals transceiver 500 has a frequency selective duplexer 502 (also known as a diplexer) instead of the T/R switches of transceivers 300 and 400. Recall, a T/R switch separates transmit signals from receive signals by allowing only the transmit signal or the receive signal to pass through the switch at any given time. Transmit signals are separated from receive signals by time resulting in time-division duplexing (TDD). Like the T/R switches of TDD systems, diplexer 502 in a FDD system separates transmit signals from receive signals.

Aspects of the subject matter described herein may be embodied in systems, apparatus, methods, and/or articles depending on the desired configuration. For example, the transceivers (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the phrase "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. In various example implementations, the methods (or processes) can be accomplished on mobile station/mobile device side or on the server side or in any shared way between server and user equipment/mobile device with actions being performed on both sides. The phrases "based on" and "based on at least" are used interchangeably herein. Other implementations may be within the scope of the following claims.

What is claimed is:

1. A system comprising:
   m antenna arrays configured to receive a propagating radio frequency signal and configured to transmit a propagating radio frequency signal, each of the antenna arrays comprising:
      a plurality of antenna elements; and
      a beamformer configured to produce n different bi-directional beams using the plurality of antenna elements; and
   n multiple-input multiple-output transceivers (MIMO), each MIMO transceiver comprising:
      a MIMO receiver configured to process m different received signals, wherein an i-th received signal to a j-th MIMO receiver corresponds to a j-th beam of an i-th antenna array; and
      a MIMO transmitter configured to process m different transmit signals, wherein a v-th transmit signal from a z-th MIMO transmitter corresponds to a z-th beam of a v-th antenna array,
   wherein m, n, v, and z are integer number values,
   wherein i=1, . . . , m, j=1, . . . , n, and v=1, . . . m,
   wherein n≥2 and m≥2,
   wherein z=1, . . . , w, and
   wherein n≥w≥2.

2. The system of claim 1, configured to substantially comply with one or more of Electrical and Electronic Engineers (IEEE) 802.11a/b/g/n/ac (WiFi), IEEE 802.16 (WiMAX), 2nd Generation Partnership Project (3GPP) Long Term Evolution (LTE), 3GPP LTE-Advanced, 3GPP LTE-TDD, 3GPP LTE-FDD, High Speed Packet Access (HSPA), and HSPA+.

3. The system of claim 1, wherein m=3 and n=6.

4. The system of claim 1, wherein the m antenna arrays are separated by a distance more than one wavelength apart at the carrier frequency.

5. The system of claim 1, wherein the antenna elements are less than or equal to one half wavelength apart at the carrier frequency.

6. The system of claim 1, wherein the beamformer is an electronic beamformer.

7. The system of claim 1, wherein the antenna array further comprises a lens.

8. The system of claim 7, wherein the lens is a Honda or Rotman lens.

9. The system of claim 1, wherein the system simultaneously provides MIMO and beamforming.

10. An apparatus comprising:
m antenna arrays configured to receive a propagating radio frequency signal and configured to transmit a propagating radio frequency signal, each of the antenna arrays comprising:
 a plurality of antenna elements; and
 a beamformer configured to produce n different bi-directional beams using the plurality of antenna elements; and
n multiple-input multiple-output transceivers (MIMO), each MIMO transceiver comprising:
 a MIMO receiver configured to process m different received signals, wherein an i-th received signal to a j-th MIMO receiver corresponds to a j-th beam of an i-th antenna array; and
 a MIMO transmitter configured to process m different transmit signals,
 wherein a v-th transmit signal from a z-th MIMO transmitter corresponds to a z-th beam of a v-th antenna array,
 wherein m, n, v, and z are integer number values, and
 wherein i=1, . . . , m, j=1, . . . , n, and v=1, . . . m,
 wherein n≥2 and m≥2
 wherein z=1, . . . , w, and
 wherein n≥w≥2.

11. The apparatus of claim 10, configured to substantially comply with one or more of Electrical and Electronic Engineers (IEEE) 802.11a/b/g/n/ac (WiFi), IEEE 802.16 (WiMAX), 2nd Generation Partnership Project (3GPP) Long Term Evolution (LTE), 3GPP LTE-Advanced, 3GPP LTE-TDD, 3GPP LTE-FDD, High Speed Packet Access (HSPA), and HSPA+.

12. The apparatus of claim 10, wherein m=3 and n=6.

13. The apparatus of claim 10, wherein the m antenna arrays are separated by a distance more than one wavelength apart at the carrier frequency.

14. The apparatus of claim 10, wherein the antenna elements are less than one half wavelength apart at the carrier frequency.

15. The apparatus of claim 10, wherein the beamformer is an electronic beamformer.

16. The apparatus of claim 10, wherein the antenna array further comprises a lens.

17. The apparatus of claim 10, wherein the lens is a Honda or Rotman lens.

18. The apparatus of claim 10, wherein the apparatus simultaneously provides MIMO and beamforming.

19. An apparatus comprising:
m antenna arrays configured to receive a propagating radio frequency signal, each of the antenna arrays comprising:
 a plurality of antenna elements; and
 a beamformer configured to produce n different receive beams using the plurality of antenna elements; and
n multiple-input multiple-output receivers (MIMO), each MIMO receiver configured to process m different received signals, wherein an i-th received signal to a j-th MIMO receiver corresponds to a j-th beam of an i-th antenna array,
wherein m and n are integer number values, and
wherein i=1, . . . , m, and j=1, . . . , n, and
wherein n≥2 and m≥2.

20. An apparatus comprising:
m antenna arrays configured to transmit a propagating radio frequency signal, each of the antenna arrays comprising:
 a plurality of antenna elements; and
 a beamformer configured to produce n different transmit beams using the plurality of antenna elements; and
n multiple-input multiple-output transmitters (MIMO), each MIMO transmitter configured to process m different transmit signals, wherein a v-th transmit signal from a z-th MIMO transmitter corresponding to a z-th beam of a v-th antenna array is selected for transmission,
wherein m, n, v, and z are integer number values, and
wherein z=1, . . . , n, and v=1, . . . m, and
wherein n≥2 and m≥2.

* * * * *